(12) United States Patent
Turco et al.

(10) Patent No.: US 11,097,900 B2
(45) Date of Patent: Aug. 24, 2021

(54) CROWNED ROLLER WITH A GROOVED APEX

(71) Applicant: INTELLIGRATED HEADQUARTERS, LLC, Mason, OH (US)

(72) Inventors: Anthony J. Turco, Liberty Township, OH (US); Matthew Ryan Otto, Fairfield, OH (US); Jarl Nicholas Sebastian, Trenton, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 16/556,457

(22) Filed: Aug. 30, 2019

(65) Prior Publication Data

US 2021/0061573 A1    Mar. 4, 2021

(51) Int. Cl.
*B65G 15/64*    (2006.01)

(52) U.S. Cl.
CPC ................ *B65G 15/64* (2013.01)

(58) Field of Classification Search
CPC ...................................... B65G 15/64
USPC ...................................... 198/835
See application file for complete search history.

(56) References Cited

U.S. PATENT DOCUMENTS

| | | | |
|---|---|---|---|
| 3,122,935 A * | 3/1964 | Morling | B65G 39/071 198/842 |
| 4,832,186 A | 5/1989 | Conrad | |
| 5,213,202 A | 5/1993 | Arnold et al. | |
| 5,284,457 A | 2/1994 | Gerstenberger et al. | |
| 7,556,144 B2 * | 7/2009 | Cotter | B65G 15/22 198/810.01 |
| 7,963,388 B2 * | 6/2011 | Eubanks | B65G 13/08 198/781.1 |
| 9,145,257 B2 * | 9/2015 | Suttie | G07F 19/202 |
| 10,464,753 B2 * | 11/2019 | Masciarelli | F16C 13/006 |
| 2006/0272930 A1 | 12/2006 | Cotter et al. | |
| 2013/0153371 A1 | 6/2013 | Suttie | |

FOREIGN PATENT DOCUMENTS

DE    102017002019 A1    9/2018
JP    2005-280868 A    10/2005

OTHER PUBLICATIONS

Extended European Search Report issued in EP Application No. 20189066.2 dated Jan. 14, 2021, 10 pages.

\* cited by examiner

*Primary Examiner* — Gene O Crawford
*Assistant Examiner* — Lester III Rushin
(74) *Attorney, Agent, or Firm* — Alston & Bird LLP

(57) ABSTRACT

A roller for a conveyor is described. The roller can have a first end, a second end, and a crown defined along a length of the roller between the first end and the second end. The crown of the roller includes a groove defined along an apex portion of the crown. The groove can support an O-ring and the crown can support a flat band mounted over the O-ring in the groove.

20 Claims, 5 Drawing Sheets

CROWNED ROLLER WITH A GROOVED APEX

TECHNOLOGICAL FIELD

Example embodiments described herein relate generally to systems and apparatuses for a roller bed of a conveyor having a roller with crowns and grooves.

BACKGROUND

In material handling systems, it is known to utilize a conveyor to transport a succession of items along a path, to merge or combine a plurality of conveying paths to fewer paths or to selectively direct items to respective desired or selected locations or desired paths. For example, using sortation conveyors, items may be selectively conveyed from the sortation conveyor onto another conveyor or to an intermediate or ultimate location by pushers, arms, pop up wheels, cross belts, tilt trays or other suitable structures. Many different configurations are known for the conveying surface of a conveyor, such as an endless conveying belt, moving slats or tubes, cross belts, tilt trays, rollers, and/or the like. An example of rollers includes elongated cylindrical rollers which may be self-driven, such as by a motorized drive roller, or driven by an underlying endless belt urged into contact with the rollers. The circumference of such rollers may be flat, i.e., cylindrical, or arcuate which may have a constant radius, i.e., spherical, or may not.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a roller of a conveyor. The roller can comprise a first end, a second end, and a crown defined between the first end and the second end along a length of the roller. The crown can comprise a groove defined along an apex portion of the crown. In accordance with said example embodiments, the groove can be configured to support an O-ring and the crown can be configured to support a flat band over the O-ring in the groove.

In some examples, the roller can comprise a plurality of crowns that can be defined between the first end and the second end along the length of the roller at pre-defined intervals on the roller.

According to said example embodiments, the apex portion of the crown can correspond to a portion of the roller that can be defined circumferentially around an axis of the roller with an increased diameter relative to a diameter of an uncrowned portion of the roller.

In some example embodiments, the O-ring can be mounted in the groove around the roller. Further, according to said example embodiments, the crown can be configured to support the flat band so that the flat band is in contact with the O-ring in the groove.

In some example embodiments, the plurality of crowns can be configured to support the positioning of a plurality of flat bands over respective O-rings mounted within the grooves of respective crowns.

In some example embodiments, an apex portion of a first crown of the plurality of crowns can be spaced apart with an apex portion of a second crown of the plurality of crowns, at a defined spacing.

According to some example embodiments, the plurality of crowns of the roller can comprise a first set of crowns defined towards a divert side of the roller. In this regard, a first spacing defined between a first pair of crowns of the first set of crowns can be configured to support tracking of a first item of a first dimension in various non-limiting embodiments. Furthermore, the plurality of crowns can comprise a second set of crowns defined towards a non-divert side of the roller. In this regard, a second spacing defined between a crown of the first set of crowns and a crown of the second set of crowns can support tracking a second item of a second dimension. Furthermore, in accordance with said example embodiments, a third spacing defined between a pair of crowns of the second set of crowns can support tracking of a third item of a third dimension.

Some example embodiments described herein relates to a conveyor system. The conveyor system can comprise a roller bed of a conveyor comprising a plurality of rollers. In accordance with said example embodiments, a roller of the plurality of rollers can comprise a crown on the roller with a groove formed in an apex portion of the crown. In this regard, the crown can be a portion of the roller with an increased diameter relative to an uncrowned portion of the roller. Further, the roller can comprise an o-ring mounted around the roller in the groove of the crown and a flat band mounted around a plurality of the rollers. According to said example embodiments, the flat band can be in contact with O-rings of each roller of the plurality of rollers.

In some example embodiments, the apex portion of the crown can correspond to a portion of the roller that can be defined circumferentially around an axis of the roller with an increased diameter relative to a diameter of an uncrowned portion of the roller.

In some example embodiments, the roller can comprise a set of crowns that are defined between a first end of the roller and a second end of the roller across a length of the roller at pre-defined intervals.

In some example embodiments, a plurality of rollers can comprise a plurality of crowns comprising a respective groove. In this regard, the plurality of crowns can be configured to support the positioning of a plurality of flat bands over respective O-rings mounted in the respective grooves of the plurality of crowns.

In some example embodiments, the conveyor system can comprise a divert unit. The divert unit can comprise a plurality of pop up wheels configured to divert an item from the roller bed to a divert section. Further, the divert unit can comprise a plurality of flat bands mounted around the plurality of rollers. In this regard, each flat band can be mounted over crowns defined on the plurality of rollers and can be in contact with a plurality of o-rings in grooves defined in respective crowns of the plurality of rollers.

In some examples, the conveyor can correspond to one of, a strip-belt sorter, a narrow belt-sorter, and a divert sorter.

According to some example embodiments, an apex portion of a first crown of the plurality of crowns can be spaced apart with an apex portion of a second crown of the plurality of crowns, at a defined spacing.

Some example embodiments described herein relate to a plurality of rollers mounted on a conveyor frame. The plurality of rollers can define a conveying surface of an item. Further, the diver unit can comprise a pop-up wheel configured to raise up from a first position to a second position towards the conveying surface to divert the item in a defined direction. The divert unit can further comprise a plurality of flat bands mounted around the plurality of rollers. In accordance with said example embodiments, a roller of the plurality of the rollers can comprise a crown of the roller with a groove formed in an apex portion of the crown. The crown can be a portion of the roller with an increased diameter relative to an uncrowned portion of the roller. The plurality of rollers can further comprise an o-ring mounted around the roller in the groove of the crown and a flat band of the plurality of flat bands mounted around a plurality of the rollers. In accordance with said example embodiments, the flat bands can be in contact with o-rings of each roller of the plurality of rollers.

In some example embodiments, the plurality of rollers can comprise a plurality of crowns that can be configured to support the plurality of flat bands. The plurality of flat bands can be mounted around the plurality of rollers over the plurality of crowns and can be in contact with O-rings in respective grooves of the plurality of crowns. In some example embodiments, the plurality of crowns can be defined on the plurality of rollers at pre-defined intervals.

According to said example embodiments, the conveyor of the divert unit can correspond to at least one of, a strip-belt sorter, a narrow belt-sorter, and a divert sorter.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
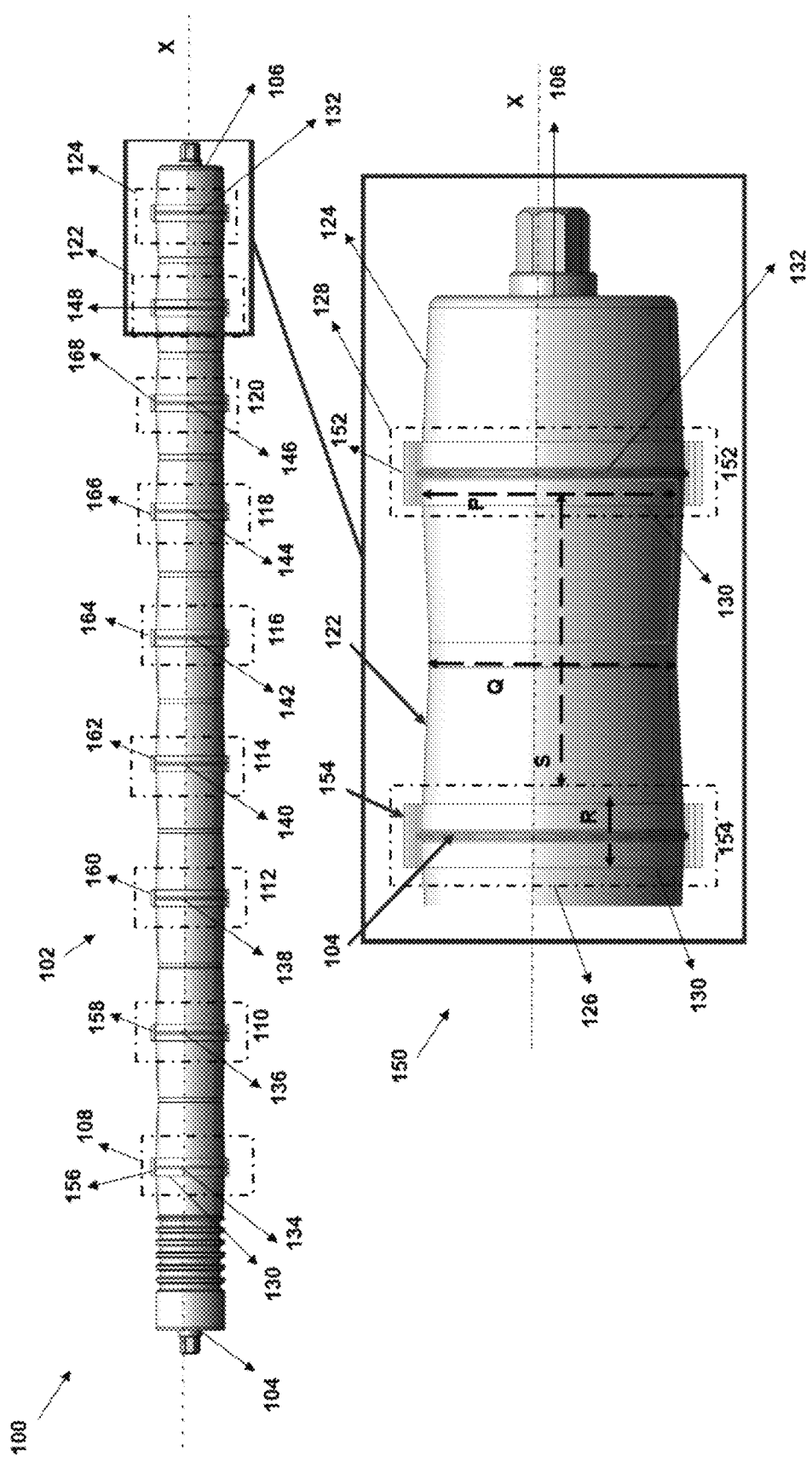
FIG. 1 illustrates a perspective view of a roller of a conveyor, in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Various example embodiments described herein relate to a roller of a conveyor that includes multiple crowns defined along a length of the roller between two ends of the roller. In some example embodiments, a crown can comprise a groove defined along an apex portion of the crown. The apex portion of the crown can be a portion of the roller that is defined circumferentially around an axis of the roller and comprises an increased diameter relative to a diameter of an uncrowned portion of the roller. The groove on the apex portion of the crown supports an O-ring that can be mounted around the roller in the groove. Further, in accordance with said example embodiments, a flat band can be supported on the crown over the O-ring in the groove. Said differently, the flat band can be mounted around multiple rollers of a roller bed of the conveyor such that, the flat band is in contact with O-rings (positioned in grooves) of each roller of the multiple rollers.

In accordance with said example embodiments, in case the band is knocked off from the defined position, the crowns of the rollers due to its geometry and design facilitates in self-correcting and moving back the knocked off bands back at the defined position on the roller (i.e. over the apex portion of the crown). Further, as the flat bands are in contact with O-bands in the grooves at the crown, the O-bands provides fine-tuning capability to track items, better grip of the flat bands, and additional support and tensioning to the flat bands mounted over the crowns of the roller.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

FIG. 1 illustrates a perspective view 100 of a roller 102 of a conveyor, in accordance with some example embodiments described herein. In some examples, the roller 102 can correspond to one roller of a plurality of rollers of a roller bed (not shown) of the conveyor. In some examples, the roller 102 referred herein, can correspond to a roller of a set of rollers of a divert unit (not shown) of the conveyor that can be used for diverting items from the conveyor to divert lanes. In some examples, the roller 102 can correspond to a roller from amongst a plurality of rollers defining a roller bed of the conveyor in a material handling system.

Illustratively, the roller 102 comprises a first end 104, a second end 106, and a plurality of crowns 108, 110, 112, 114, 116, 118, 120, 122, and 124 (referred hereinafter as 108-124) defined along a length of the roller 102 between the first end 104 and the second end 106 of the roller 102. In accordance with various example embodiments described herein, each crown of the crowns 108-124 can comprise an apex portion that can be defined circumferentially around an axis X of the roller 102. For instance, referring to enlarged view 150a of the crowns 122 and 124 of the roller 102, each of the crowns 122 and 124 can comprise an apex portion 126 and 128 respectively, that is defined circumferentially around the axis X of the roller 102. In accordance with said example embodiments, the apex portions (e.g. the apex portion 126 of the crown 122 and apex portion 128 of the crown 124) corresponds to a portion of the roller 102 with an increased diameter relative to a diameter of an uncrowned portion of the roller 102. For instance, referring to the enlarged view 150, the apex portion 128 of the crown 126 can be of a diameter P which is more than a diameter Q of an uncrowned portion of the roller 102.

Further, in accordance with said example embodiments, at least a crown of the crowns (108-124) of the roller 102 can comprise a groove 130. The groove 130 can be formed in the apex portion of the respective crown (108-124). For instance, referring to enlarged view 150, the crown 122 comprises the apex portion 126 and the groove 130 formed in the apex portion 126. The groove 130 can be of a defined width R and can be defined around a periphery of the roller, i.e. on the apex portions of each crown of the crowns 108-124 of the roller 102. In accordance with said example embodiments, the groove 130 can be configured to support mounting of an O-ring 132 around the roller 102 in the groove 130. Said differently, the O-ring 132 can be mounted around a periphery on a lateral surface of the roller 102 in the groove 130 on each crown of the crowns (108-124).

Referring to FIG. 1, as illustrated, each crown of the crowns 108-124 of the roller 102 comprises a respective apex portion on which a respective groove 130 is defined. Illustratively, in accordance with said example embodiments, each crown of the plurality of crowns 108-130 supports mounting of O-rings 132, 134, 136, 138, 140, 142, 144, 146, and 148 (referred hereinafter as 132-148) in the groove 130 of respective crowns. Said that, in accordance with said example embodiments, at least a crown of the plurality of crowns (108-124) can be configured to support a flat band 152 over the O-ring 132 in the groove 130.

Thus, the roller 102 can comprise the plurality of crowns (108-124), a flat band over can be supported over the crown and a respective O-ring can be mounted in the respective groove of the crown. For example, as illustrated, a plurality of flat bands 152, 154, 156, 158, 160, 162, 164, 166, and 168 (referred hereinafter as, 152-168) can be supported over the O-bands (132-148) mounted in the grooves 130 of the crowns (108-124) respectively, on the roller 102. Thus, in accordance with said example embodiments, the roller 102 of the conveyor comprises the plurality of crowns (108-124) that supports the positioning of a plurality of flat bands (152-168) over respective O-rings (132-148) in the grooves 130 of respective crowns. Positioning the flat bands (152-168) over the crowns (108-124) and in contact with a respective O-ring (132-148) provides (a) self-correction of the flat-band to be positioned at the defined position on the roller 102 (e.g. at an apex of the crown) and (b) additional grip and fine-tuning of tracking items due to support provided by the O-rings (132-148) in contact with the respective flat bands (152-168). In this regard, in some example embodiments, each flat band of the plurality of flat bands (152-168) can be mounted around a set of rollers (not shown) such that, the flat band can be in contact with O-rings of each roller of the set of rollers. The set of rollers referred herein, in some example, may comprise two or more rollers similar to the roller 102 that can be adjacently positioned to each other to form a roller bed of a section (for example, a divert unit) of the conveyor. Further details related to the section of the conveyor referred herein, are described in reference to FIG. 2.

Referring to FIG. 1, the plurality of crowns 108-124 of the roller 102 can be defined between the first end 104 and the second end 106 along the length of the roller 102 at pre-defined intervals. For instance, in some example embodiments, the apex portion 128 of the crown 124 of the plurality of crowns (108-124) can be spaced apart with the apex portion 126 of the crown 122 at a defined spacing S cm. For example, in some embodiments, each crown of the plurality of crowns 108-124 can be defined at a spacing of 1 cm with respect to an adjacent crown on the roller 102. In some example embodiments, the plurality of crowns 108-124 may comprise a first set of crowns (e.g. crowns 118-124) that may be spaced apart at a first spacing between each pair of crowns defined adjacently to each other on the roller 102 and a second set of crowns (112-116) that may be spaced apart at a second spacing between each pair of crowns defined adjacently to each other on the roller 102. Further, details related to spacing amongst crowns of the plurality of crowns (108-124) are described in reference to FIG. 2.

Figure 2:
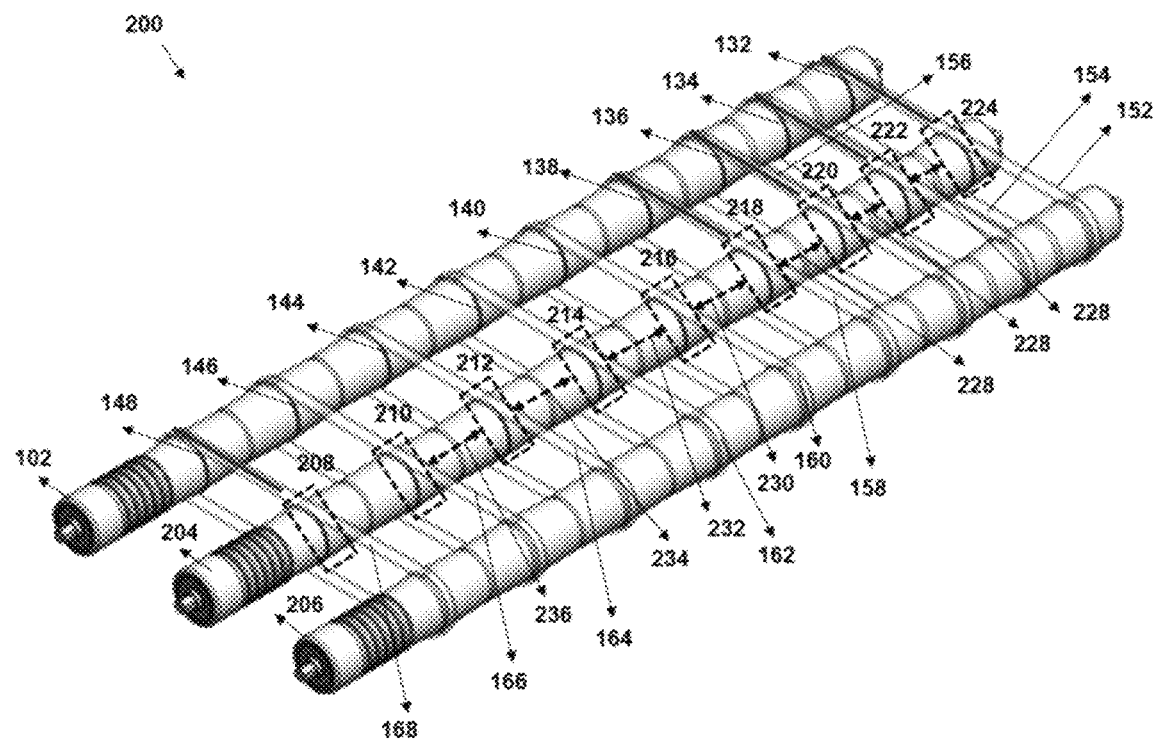
FIG. 2 schematically depicts a section of a roller bed of the conveyor comprising a plurality of rollers, in accordance with some example embodiments described herein.

FIG. 2 schematically depicts a section of a roller bed 200 of the conveyor comprising a plurality of rollers 102, 202, and 204, in accordance with some example embodiments described herein. In some example embodiments, the plurality of rollers 102-204 can correspond to a section of a divert unit of the conveyor that can be configured for diverting items from the conveyor 102 to divert track (not shown), as the items move over flat bands over the rollers 102, 202, and 204 of the divert unit. In some other examples, the plurality of rollers 102, 202, and 204 can correspond to a section of a roller bed of a sortation conveyor. Illustratively, the plurality of rollers 102, 202, and 204 can comprise rollers 204 and 206 of similar design and structure as of the roller 102. For instance, similar to roller 102 described in FIG. 1, the roller 204 comprises a plurality of crowns 208-224 defined about a length of the roller 204. Illustratively, in accordance with some example embodiments, the plurality of flat bands (152-168) can be mounted over the plurality of crowns of the respective rollers 102, 202, and 204. In this regard, the plurality of flat bands (152-168) can be mounted around the rollers 102, 202, and 204 such that, the plurality of flat bands (152-168) can be in contact with O-bands in grooves of the respective rollers. For example, as illustrated, the plurality of flat bands (152-168) are mounted over the crowns (108-124) of the roller 102 and are in contact with the O-bands (132-148) in the grooves 130 defined on the crowns (108-124) of the roller 102 respectively.

In accordance with said example embodiments, crowns can be defined on each roller of the plurality of rollers 102, 202, and 204 such that, a pair of two adjacent crowns defined on the respective roller (102, 202, or 204), may be at a different or at a same and/or similar spacing compared to spacing between another two adjacently defined crowns on the roller (102, 202, and 204). For instance, in some example embodiments, the plurality of crowns (208-224) of the roller 202 can comprise a first set of crowns (comprising crowns 224, 222, 220, and 218) that may be defined on the roller 202 such that, a crown in each pair of adjacent crowns (224, 222), (222, 220), (220, 218) is defined at a first spacing 228 relative to the other crown in the respective pair. Further, the plurality of crowns (208-224) of the roller 202 can comprise a second set of crowns (212, 214, 216, and 218) towards a non-divert side of the section of conveyor, that may be defined such that, a crown in each pair of adjacent crowns (210, 212), (212, 214), (214, 216), and (216, 218) is defined at a second spacing 230 relative to the other crown in the respective pair. In some examples, the first set of crowns (218-224) referred herein, can correspond to crowns that may defined towards a divert side of the conveyor. The divert side referred herein, represents to a side of the conveyor towards which the item can be diverted from the conveyor by the section (e.g. a divert unit) of the conveyor. In accordance with said example embodiments, the first spacing 228 can be different from the second spacing 230. In this regard, a spacing at which a crown from an adjacent crown can be defined on the roller caters to tracking items of different dimensions on the conveyor. For example, items of a first dimension (e.g. size) may be tracked by flat bands positioned over crowns separated apart at a first spacing on the roller 102 and items of a second dimension may be tracked by flat bands positioned over crowns separated apart at a second spacing on the roller 102. Said differently, items are inflowed into the divert section from a conveyor section and over the flat bands depending on a spacing between the flat bands and a dimension of items to be tracked by the respective flat bands, further details of which are described hereinafter.

According to said example embodiments, the first set of crowns can include crowns 224, 222, 220, and 218 that are defined on the roller 202 with the first spacing 228 between each adjacent pair of crowns. The first spacing 228 between the adjacent pairs of crowns (224, 222), (222, 220), (220, 218) can support a narrow belt spacing arrangement (i.e. belts or flat bands placed narrowly or closer to each other as compared to belts spaced in wide belt spacing arrangement) of flat bands 152, 154, 156, and 158 mounted over the first set of crowns (218-224). In this regard, in some example embodiments, the first spacing 228 between pairs of crowns of the first set of crowns (218-224) can support tracking movement of items of a first dimension (e.g. smaller packages) on the section of the conveyor. Accordingly, the second set of crowns (212-218) can be defined on the roller 102 with the second spacing 230 between adjacent pairs of crowns of the second set of crowns (212-218). The second spacing 230 between crowns in each pairs of crowns of the second set of crowns (212-218) can support a belt spacing that may be a standard spacing (i.e. a spacing generally used in conveyor industry as per standard size of items or packages) to track movement of items of a second dimension (e.g. normal-sized packages) on the section of the conveyor. Similarly, in some example embodiments, some pairs of crowns can be defined on the rollers, at a third spacing to support tracking of items of a third-dimension type.

In accordance with various example embodiments described herein, the plurality of rollers 102, 202, and 204 can be configured to rotate about a respective axis of the plurality of rollers 102, 202, and 204. In some examples, one or more rollers of the plurality of rollers 102, 202, and 204 can be motorized and coupled to a drive motor that drives rotation of the respective rollers about its axis. Rotation of the plurality of rollers 102, 202, and 204 drives movement of the plurality of flat bands (152-168) about the crowns, thereby causing movement of an item on any of the plurality of flat bands (152-168). Further details related to the conveyance of item on the plurality of rollers 102, 202, and 204 are described hereinafter in reference to FIG. 3.

Figure 3:
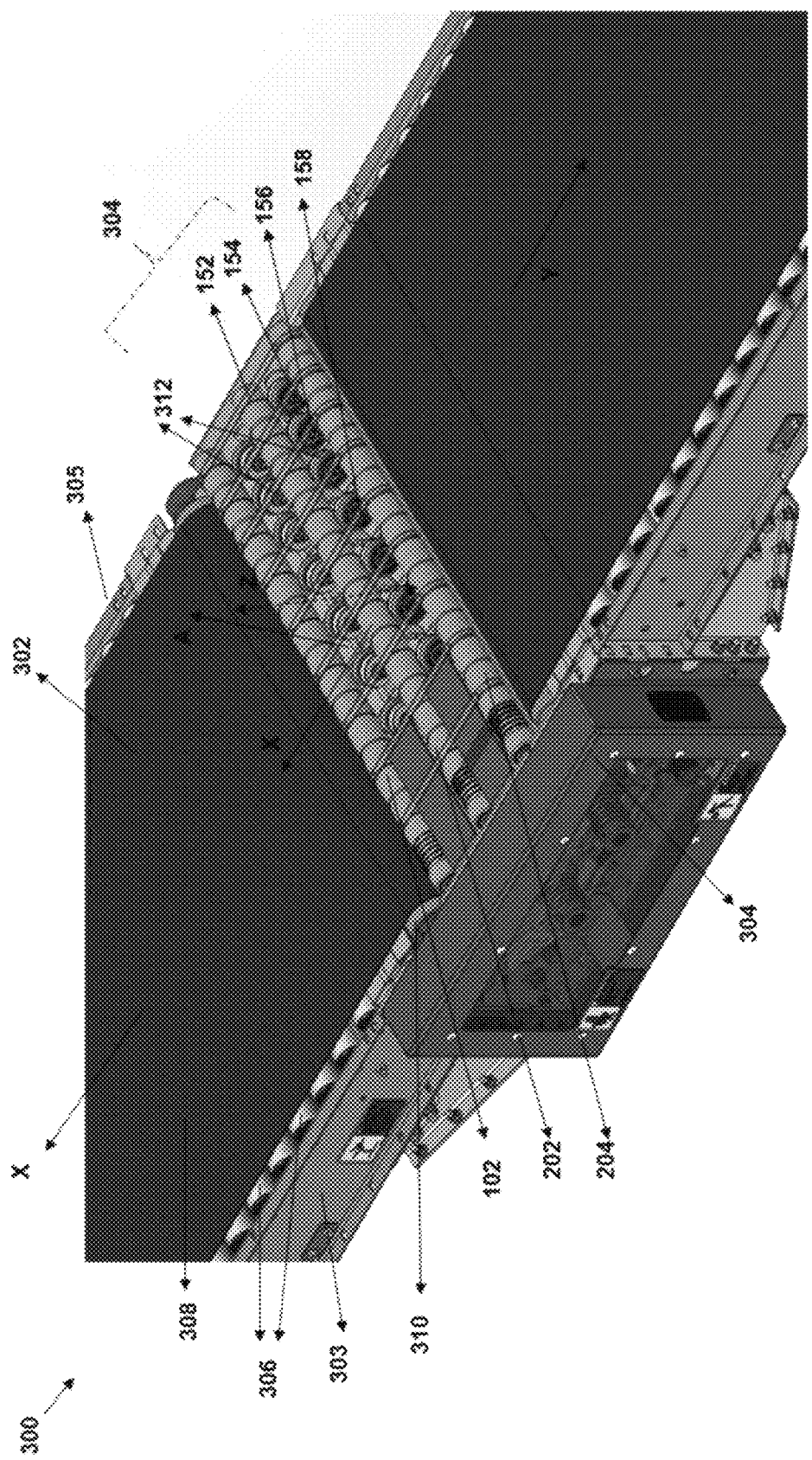
FIG. 3 illustrates a perspective view of conveyor system comprising a conveyor with a divert unit comprising the plurality of rollers, in accordance with some example embodiments described herein.

FIG. 3 illustrates a perspective view of a conveyor system 300 comprising a conveyor 302 and a divert unit 304 positioned between two sections of the conveyor 303, in accordance with some example embodiments described herein. The divert unit 304 can comprise the plurality of rollers 102, 202, and 204, as described in reference to FIGS. 1-2. According to said example embodiments, the divert unit 304 can be coupled to a divert section (e.g. a divert lane) and configured to cause diverting of an item on the conveyor 302 into the divert section. In this regard, in some examples, the divert section or the divert lane can be mechanically connected to a side of the conveyor 302. Illustratively, the conveyor 302 can comprise a roller bed 306 defined by a plurality of rollers (drive rollers and idler rollers) that can be installed between two side frames 303 and 305 of the conveyor 302. Further, in accordance with said example embodiments, the conveyor 302 can also comprise a conveyor belt 308 that can be mounted around the plurality of rollers (motorized or non-motorized) of the roller bed 306.

In some example embodiments, the roller bed 306 of the conveyor 300 may comprise at least one motorized roller and a plurality of non-motorized rollers. The motorized roller can be coupled to a drive motor that can be actuated by a motor controller to cause rotation of the motorized rollers. Further, the motorized roller can be coupled to the plurality of non-motorized rollers, via a connection assembly, for example, but not limited to, drive bands, idler pulleys, O-bands, belt arrangement, drive pulley arrangement, and/or the like, such that non-motorized rollers of the roller bed can follow rotation of the motorized roller, thereby moving the conveyor belt 308 over the roller bed 306. In some examples, the roller bed may only comprise non-motorized rollers that can be rotated based on a driving belt and pulley arrangement coupled to a drive motor.

In said example embodiments, the conveyor belt 308 mounted around the roller bed 306 can be configured to move around the plurality of rollers of the roller bed 306 based on rotation of the rollers of the roller bed 306, thereby causing movement of an item on the conveyor 302 in an upstream direction X or downstream direction Y of conveyance of items. According to said example embodiments, the motorized rollers of the roller bed 306 may be controlled by motor controllers (not shown) which can communicate with a programmable controller (not shown) of the conveyor system 300. In some examples, the programmable controller (PC) may correspond to an industrial PC that can communicate with the motor controllers actuating the drive motor to cause rotation of the motorized rollers of the roller bed 306.

In accordance with said example embodiments, the conveyor system 300 may further comprise a plurality of pop-wheels 312 that can be positioned beneath the plurality of rollers 102, 202, and 204 in a section of the divert unit 304. The plurality of pop-up wheels 312 may be configured to actuate and in response to actuation, cause diverting of the item from the conveyor 302 to the divert section. In this regard, the pop-up wheels 312 can be configured to be moved from a first position to a second position in a direction Z, relative to the plurality of rollers 102, 202, and 204 to cause the diverting of the item on the flat bands of the rollers 102, 202, and 204. For instance, the pop-up wheels 312 can be: (a) raised up from the first position to the second position and rotated about an axis to cause diverting of the item, and subsequently can be (b) lowered down to reach back the first position. The pop-up wheels 312 can comprise wheels that can be configured to rotate about its axis, in response to reaching the raised-up position, to cause deflection of the item incoming on the divert unit 304 of the conveyor 102, in a desired direction, for example towards the divert lane (not shown).

In accordance with some example embodiments, as described before in reference to FIG. 2, the flat bands (152-168) (mounted over apex portions of respective crowns on the plurality of the rollers 102, 202, and 204) may be spaced apart from each other at different spacings (e.g. the first spacing 228 or the second spacing 230). For instance, the flat bands 152, 154, 156, and 158 may be placed closer to each other on the plurality of rollers 102, 202, and 204 compared to spacing between the flat bands 160-168. Said that, in some example embodiments, in an operation, items of varying dimensions on the conveyor belt 308 and may move in the upstream direction X from an end of the conveyor 302 to the divert unit 304 such that, an item of a first dimension (for example, a smaller package) may move onto the flat bands 152-156 over of the plurality of rollers 102, 202, and 204 and another item of a second dimension (for example, a larger package) may move onto the flat bands 160-166 over the plurality of rollers 102, 202, and 204. In this regard, in accordance with some example embodiments, the conveyor system 300 may comprise manipulators such as robotic arms or gripper devices, and/or the like, that can be configured to position the items on the conveyor 302 at a desired position in such a manner, that an item of a first dimension can be received over a first set of flat bands (i.e. the flat bands 152-158) mounted around the first set of crowns of the respective rollers 102, 202, and 204 and the other item of a second dimension can be received over a second set of flat bands (i.e. the flat bands 162-166) mounted around the second set of crowns of the respective rollers 102, 202, and 204.

Although FIG. 3 describes, the plurality of rollers 102, 202, and 204 to be a part of the divert unit 304, however, without limiting a scope of the present subject matter, in accordance with some example embodiments, the rollers 102, 202, and 204 can be a part of the roller bed 306 or any other conveying section of the conveyor 300. For instance, in some example embodiments, the conveyor 302 may comprise a roller bed defined by a plurality of rollers comprising rollers like the roller 102, as described in reference to FIG. 1.

Figure 4:
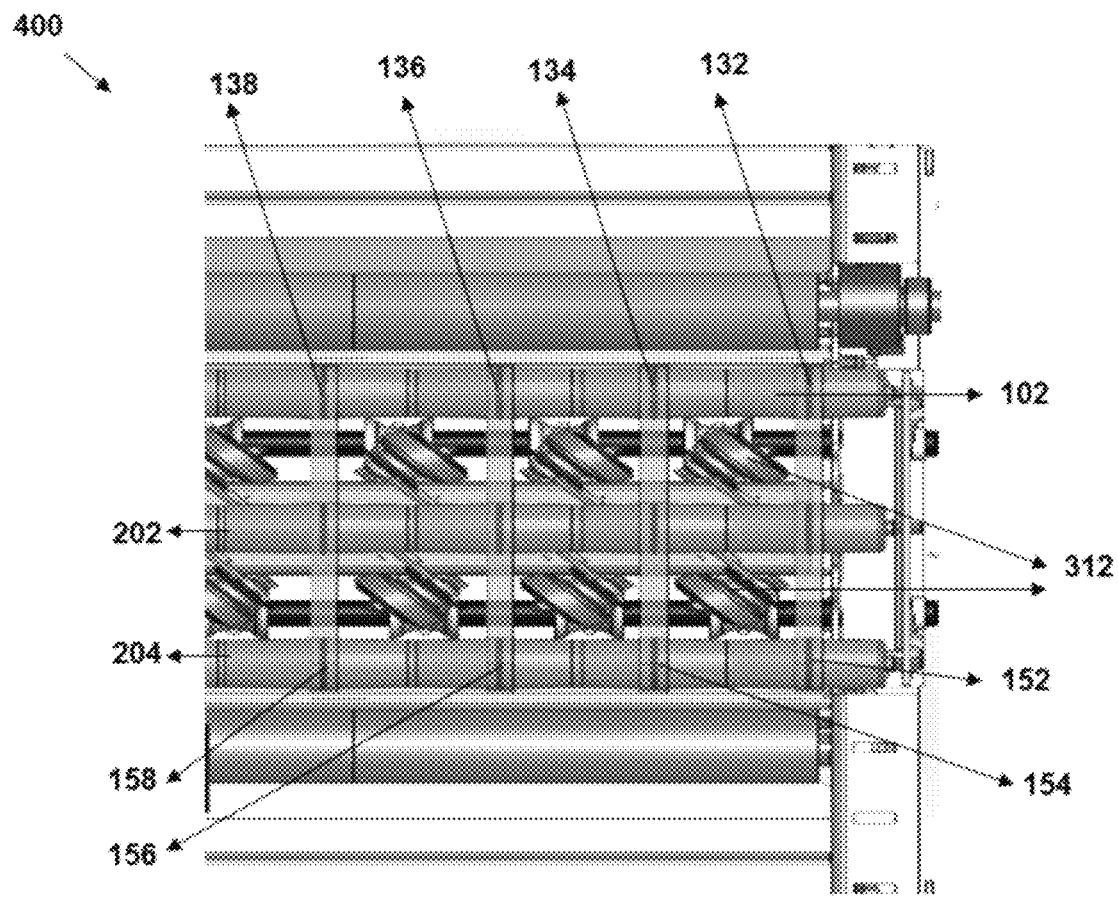
FIG. 4 illustrates a top perspective view of the divert unit of the conveyor of the conveyor system, in accordance with some example embodiments described herein.

FIG. 4 illustrates a top perspective view 400 of the divert unit 304 of the conveyor 302 of the conveyor system 300, described in FIG. 3, in accordance with some example embodiments described herein. Illustratively, the top perspective view 400 of the divert unit 304 of the conveyor 302 depicts a plurality of flat bands (152-158) mound around the rollers 102, 202, and 204. As illustrated, the plurality of flat bands (152-158) are positioned over crowns and can be in contact with O-rings (132-138) in grooves of respective crowns of the rollers 102, 202, and 204.

Figure 5:
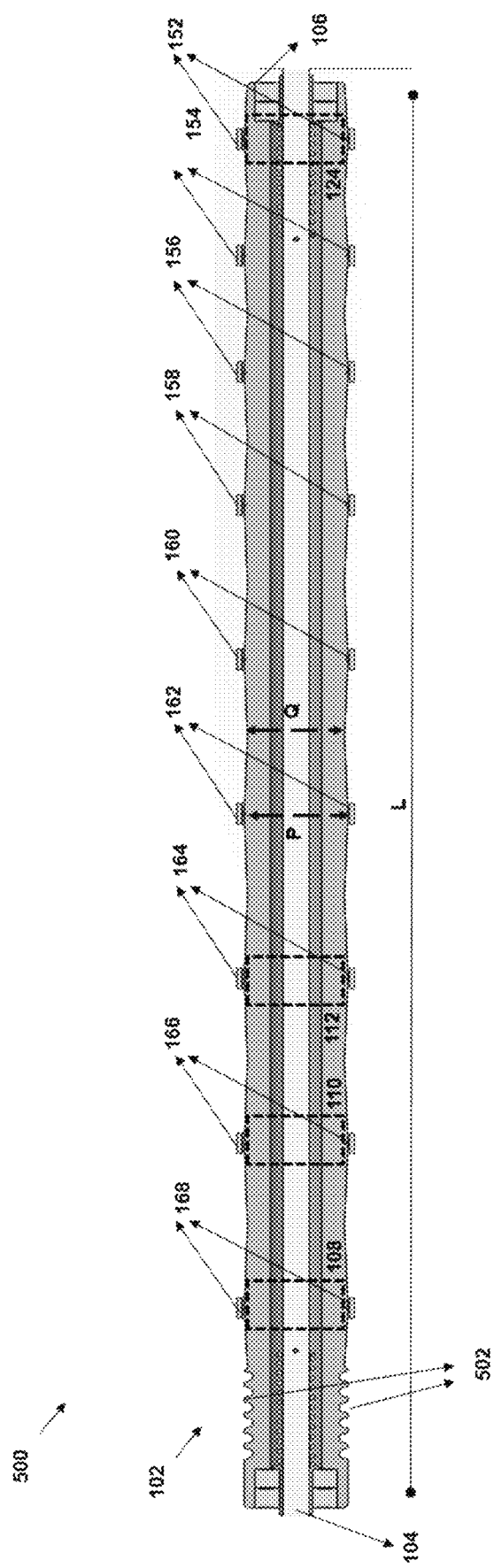
FIG. 5 illustrates a side perspective view of the roller of the roller bed, in accordance with some example embodiments described herein.

FIG. 5 illustrates a side perspective view 500 of the roller 102 of the roller bed 306, in accordance with some example embodiments described herein. Illustratively, the roller 102 comprises the plurality of crowns (108-124) defined along a length L of the roller 102 between the first end 102 and the second end 104 of the roller 102. As described before in reference to FIG. 104, the crowns (108-124) comprises apex portions with an increased diameter P relative to diameter Q of an uncrowned portion of the roller 102. Further, the plurality of flat bands 152-168 mounted around the crowns (108-124) of the roller 102 are illustrated. In accordance with said example embodiments, the roller 102 also comprises features 502 in form of threadings around which a drive belt can be mounted.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A roller for a sortation conveyor comprising:
    a first end;
    a second end; and
    a plurality of crowns defined at pre-defined intervals, wherein each crown of the plurality of crowns comprises a groove defined along an apex portion of the respective crown and wherein the groove is configured to support an O-ring and the crown is configured to support a flat band over the O-ring in the groove, wherein the plurality of crowns comprises at least a first set of crowns and a second set of crowns, and
    wherein the first set of crowns are defined towards a divert side of the roller, and wherein a first spacing between a first pair of crowns of the first set of crowns facilitates tracking of a first item of a first dimension,
    wherein the second set of crowns are defined towards a non-divert side of the roller, wherein a second spacing between a crown of the first set of crowns and a crown of the second set of crowns facilitates tracking of a second item of a second dimension.

2. The roller of claim 1, wherein the roller comprises the plurality of crowns that are defined between the first end and the second end along the length of the roller.

3. The roller of claim 1, wherein the apex portion of each crown of the plurality of crowns corresponds to a portion of the roller that is defined circumferentially around an axis of the roller with an increased diameter relative to a diameter of an uncrowned portion of the roller.

4. The roller of claim 1, wherein the O-ring is mounted in the groove around the roller and wherein the crown is configured to support the flat band so that the flat band is in contact with the O-ring in the groove.

5. The roller of claim 2, wherein the plurality of crowns are configured to support positioning of plurality of flat bands to support the sortation of the items and wherein each flat band of the plurality of flat band is supported over a respective O-ring mounted within the respective grooves of the respective crown.

6. The roller of claim 2, wherein an apex portion of a first crown of the plurality of crowns is spaced apart with an apex portion of a second crown of the plurality of crowns, at a defined spacing.

7. The roller of claim 1,
wherein a third spacing defined between a pair of crowns of the second set of crowns is to support tracking of a third item of a third dimension.

8. A sortation conveyor system comprising:
a divert unit; and
a sortation conveyor, wherein at least one of the divert unit and the sortation conveyor comprises a roller bed comprising a plurality of rollers, wherein a roller of the plurality of rollers comprises:
a plurality of crowns and a plurality of uncrowned portions defined at pre-defined intervals, wherein each crown of the plurality of crowns comprises a groove formed in an apex portion of the respective crown, wherein the plurality of crowns corresponds to a portion of the roller with an increased diameter relative to the plurality of uncrowned portions of the roller, wherein the plurality of crowns further comprises a set of crowns such that the set of crowns comprises at least a first set of crowns and a second set of crowns,
wherein the first set of crowns are defined towards a divert side of the roller, and wherein a first spacing between a first pair of crowns of the first set of crowns facilitates tracking of a first item of a first dimension,
wherein the second set of crowns are defined towards a non-divert side of the roller, wherein a second spacing between a crown of the first set of crowns and a crown of the second set of crowns facilitates tracking of a second item of a second dimension;
a plurality of o-rings mounted around the roller, wherein each O-ring of the plurality of O-rings is mounted in the groove of the respective crown; and
a plurality of flat bands mounted around a plurality of the rollers, wherein each flat band is in contact with an o-ring of the respective roller of the plurality of rollers.

9. The conveyor system of claim 8, wherein the apex portion of the crown corresponds to a portion of the roller that is defined circumferentially around an axis of the roller with an increased diameter relative to remaining portion of the crown.

10. The conveyor system of claim 8, wherein the set of crowns are defined between a first end of the roller and a second end of the roller across a length of the roller.

11. The conveyor system of claim 8, wherein the plurality of rollers comprises the plurality of crowns comprising a respective groove and wherein the plurality of crowns are configured to support positioning of a plurality of flat bands over respective O-rings mounted in the respective grooves of the plurality of crowns.

12. The conveyor system of claim 8, wherein the divert unit comprises:
a plurality of pop up wheels configured to divert an item from the roller bed to a divert section.

13. The conveyor system of claim 8, wherein the sortation conveyor corresponds to one of, a strip-belt sorter, a narrow belt-sorter, and a divert sorter.

14. The conveyor system of claim 10, wherein an apex portion of a first crown of the plurality of crowns is spaced apart with an apex portion of a second crown of the plurality of crowns, at a defined spacing.

15. The conveyor system of claim 8,
wherein a third spacing defined between a pair of crowns of the second set of crowns is to support tracking of a third item of a third dimension.

16. A divert unit of a sortation conveyor comprising:
a plurality of rollers mounted on a conveyor frame, the plurality of rollers defining a conveying surface of an item;
a pop-up wheel configured to raise up from a first position to a second position towards the conveying surface to divert the item in a defined direction,
a plurality of flat bands mounted around the plurality of rollers, wherein the plurality of rollers comprises, a roller comprising:
a plurality of crowns defined on the roller at pre-defined intervals, wherein each crown of the plurality of crowns comprises a groove formed in an apex portion of the respective crown, wherein each crown of the plurality of crowns corresponds to a portion of the roller with an increased diameter relative to an uncrowned portion of the roller, wherein the plurality of crowns comprises at least a first set of crowns and a second set of crowns,
wherein the first set of crowns are defined towards a divert side of the roller, and wherein a first spacing between a first pair of crowns of the first set of crowns facilitates tracking of a first item of a first dimension,
wherein the second set of crowns are defined towards a non-divert side of the roller, wherein a second spacing between a crown of the first set of crowns and a crown of the second set of crowns facilitates tracking of a second item of a second dimension;
a plurality of o-rings mounted around the roller, wherein each O-ring of the plurality of O-rings is mounted in the groove of the respective crown; and
a plurality of flat bands mounted around a plurality of the rollers, wherein each flat band is in contact with an o-ring of the respective roller of the plurality of rollers.

17. The divert unit of claim 16, wherein the plurality of rollers comprises the plurality of crowns configured to support the plurality of flat bands mounted around the plurality of rollers over the plurality of crowns and in contact with O-rings in respective grooves of the plurality of crowns.

18. The divert unit of claim 17, wherein the plurality of crowns are defined between a first end and a second end along a length of the plurality of rollers.

19. The divert unit of claim 16,
wherein a third spacing defined between a pair of crowns of the second set of crowns is to support tracking of a third item of a third dimension.

20. The divert unit of claim 16, wherein the sortation conveyor corresponds to at least one of a strip-belt sorter, a narrow belt-sorter, or a divert sorter.

* * * * *